(12) United States Patent
Chen (10) Patent No.: US 12,326,575 B2
(45) Date of Patent: Jun. 10, 2025

(54) OPTICAL SENSING DEVICE

(71) Applicant: Chicony Electronics Co., Ltd., New Taipei (TW)

(72) Inventor: Chien-Yueh Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 107 days.

(21) Appl. No.: 18/306,239

(22) Filed: Apr. 25, 2023

(65) Prior Publication Data
US 2024/0210718 A1    Jun. 27, 2024

(30) Foreign Application Priority Data
Dec. 21, 2022 (TW) .................. 111149123

(51) Int. Cl.
| | | |
|---|---|---|
| G02B 27/42 | (2006.01) | |
| G02B 13/06 | (2006.01) | |
| G02B 13/14 | (2006.01) | |
| G02B 17/08 | (2006.01) | |
| G02B 27/00 | (2006.01) | |
| H04N 23/20 | (2023.01) | |
| H04N 23/55 | (2023.01) | |
| H04N 23/56 | (2023.01) | |

(52) U.S. Cl.
CPC ......... *G02B 27/4205* (2013.01); *G02B 13/06* (2013.01); *G02B 13/14* (2013.01); *G02B 17/08* (2013.01); *H04N 23/20* (2023.01); *H04N 23/55* (2023.01); *H04N 23/56* (2023.01); *G02B 27/0006* (2013.01)

(58) Field of Classification Search
CPC .... G02B 27/4205; G02B 13/06; G02B 13/14; G02B 17/08; G02B 27/0006; H04N 23/20; H04N 23/55; H04N 23/56
See application file for complete search history.

(56) References Cited

U.S. PATENT DOCUMENTS 6,415,105 B1 * 7/2002 Sasaki .................. G03B 5/00
396/55
2014/0139840 A1 * 5/2014 Judkewitz .......... G02B 21/0076
356/456

(Continued)

FOREIGN PATENT DOCUMENTS

CN          109074470          12/2018

OTHER PUBLICATIONS

"Office Action of Taiwan Counterpart Application", issued on Sep. 5, 2023, p. 1-p. 7.

*Primary Examiner* — Nasim N Nirjhar
(74) *Attorney, Agent, or Firm* — JCIPRNET (57) ABSTRACT

An optical sensing device including a base, a light sensing element, an image capturing lens, at least one light source, and a top cover is provided. The light sensing element is disposed on the base. The image capturing lens is disposed above the light sensing element. The light source is disposed on the base, beside the light sensing element, and configured to emit a light beam. The top cover covers the light source and has a slit pattern. The slit pattern includes at least one slit. The slit pattern is disposed on a path of the light beam to diffract the light beam. The image capturing lens is configured to collect a signal light formed by an outside object reflecting a diffracted light beam and transmit the signal light to the light sensing element.

18 Claims, 7 Drawing Sheets

(56) References Cited

U.S. PATENT DOCUMENTS

| | | | |
|---|---|---|---|
| 2019/0011529 A1* | 1/2019 | Choi | G02B 27/48 |
| 2019/0104241 A1* | 4/2019 | Handshaw | H04N 1/107 |
| 2020/0240842 A1* | 7/2020 | Priore | G01J 3/18 |
| 2020/0391484 A1* | 12/2020 | Oota | B32B 15/20 |

* cited by examiner

OPTICAL SENSING DEVICE

CROSS-REFERENCE TO RELATED APPLICATION

This application claims the priority benefit of Taiwan application serial no. 111149123, filed on Dec. 21, 2022. The entirety of the above-mentioned patent application is hereby incorporated by reference herein and made a part of this specification.

BACKGROUND

Technical Field

The invention relates to a sensing device, and particularly relates to an optical sensing device.

Description of Related Art

Along with advancement of optical sensing and monitoring technology, image sensing and monitoring devices for a visible light band and an infrared light band are gradually developed. Infrared light sensing may be applied to night vision lenses, which may sense changes of an external environment in a low illumination or no illumination situation.

Moreover, along with advancement of image processing software, optical sensing hardware may be combined with software algorithms to achieve more automatic monitoring or status recognition effects. A general infrared night vision lens is usually equipped with an infrared light source to project infrared light to an outside object, and after the outside object reflects the infrared light, the infrared light is sensed by the night vision lens and a light sensor thereof. However, if the infrared light source projects uniform infrared light to the outside object, it will be more difficult for the algorithm to calculate movement parameters of the outside object.

SUMMARY

The invention is directed to an optical sensing device, which is adapted to generate virtual borders to facilitate processing of an algorithm.

An embodiment of the invention provides an optical sensing device including a base, a light sensing element, an image capturing lens, at least one light source, and a top cover. The light sensing element is disposed on the base. The image capturing lens is disposed above the light sensing element. The at least one light source is disposed on the base, located beside the light sensing element, and configured to emit at least one light beam. The top cover covers the at least one light source and has at least one slit pattern. The slit pattern includes at least one slit. The at least one slit pattern is disposed on a path of the at least one light beam to diffract the at least one light beam. The image capturing lens is configured to collect a signal light formed by an outside object reflecting a diffracted light beam and transmit the signal light to the light sensing element.

In the optical sensing device of the embodiment of the invention, the slit pattern is adapted to diffract the light beam emitted by the light source to generate diffraction stripes on an outside object, and these diffraction stripes are adapted to be used as virtual borders for the algorithm to calculate the movement parameters of the object. Therefore, the optical sensing device of the embodiment is adapted to generate virtual borders to facilitate processing of the algorithm.

DESCRIPTION OF THE EMBODIMENTS

Figure 1:
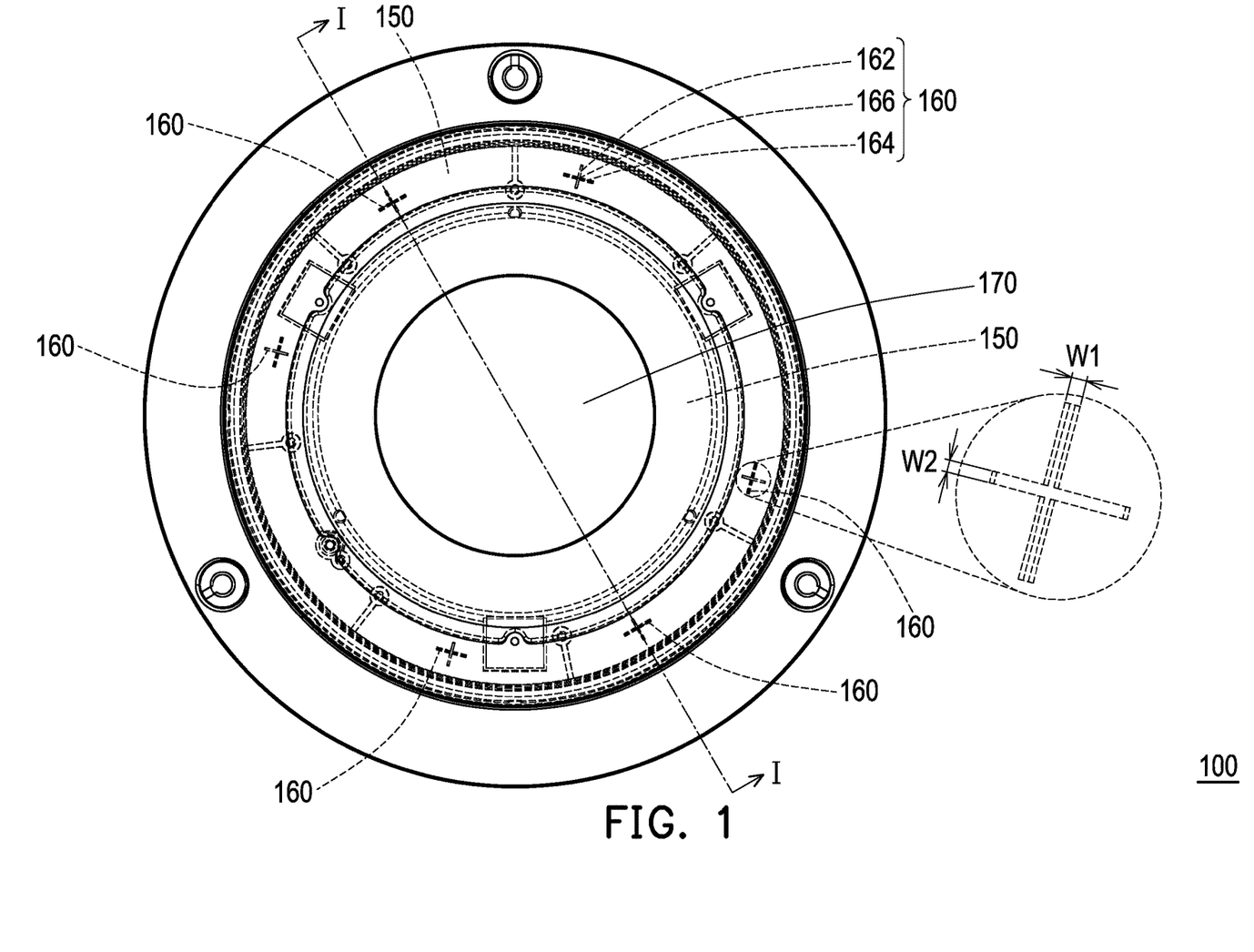
FIG. 1 is a schematic top view of an optical sensing device according to an embodiment of the invention.
Figure 2:
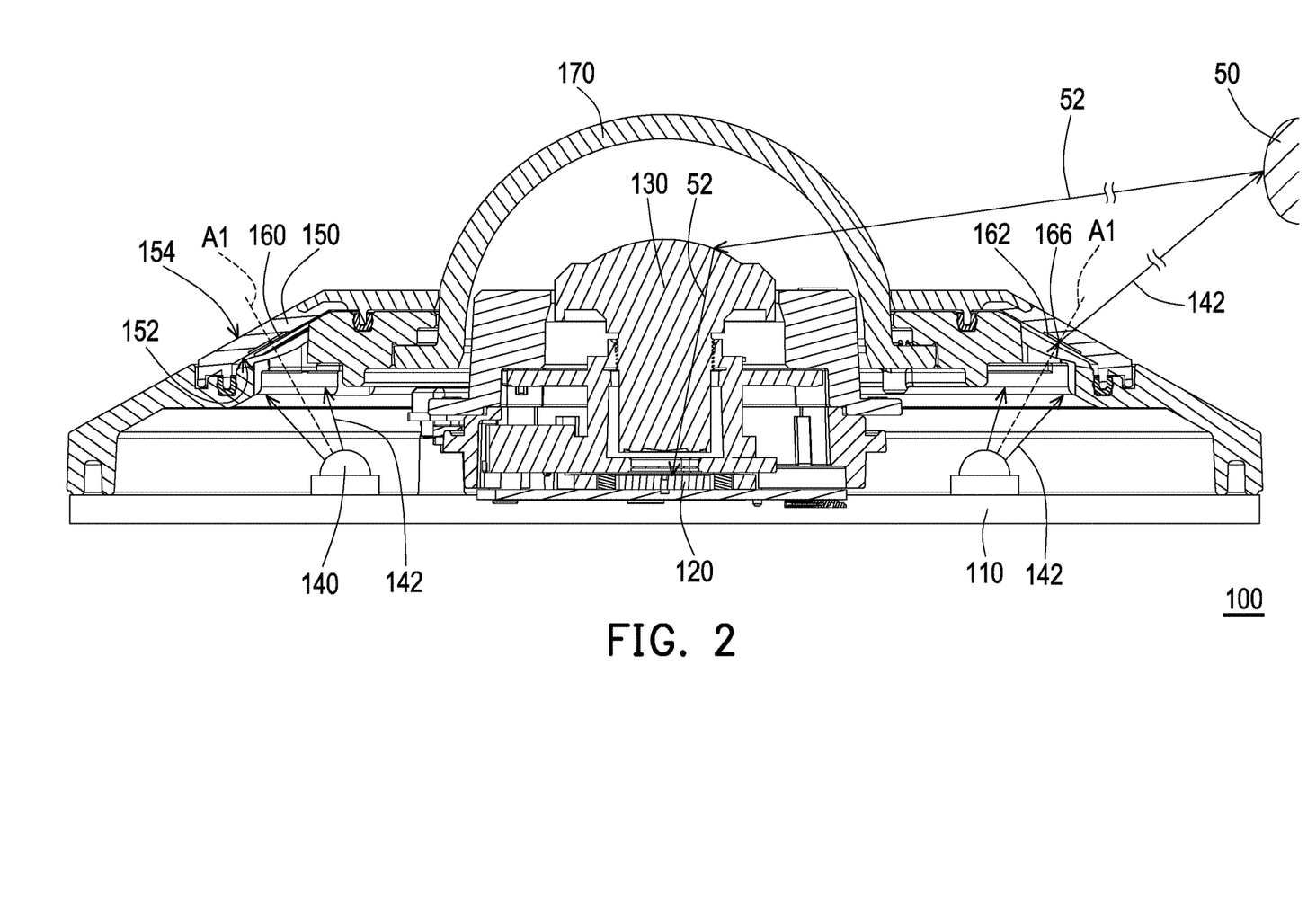
FIG. 2 is a schematic cross-sectional view of the optical sensing device of FIG. 1 viewing along a line I-I.
Figure 3:
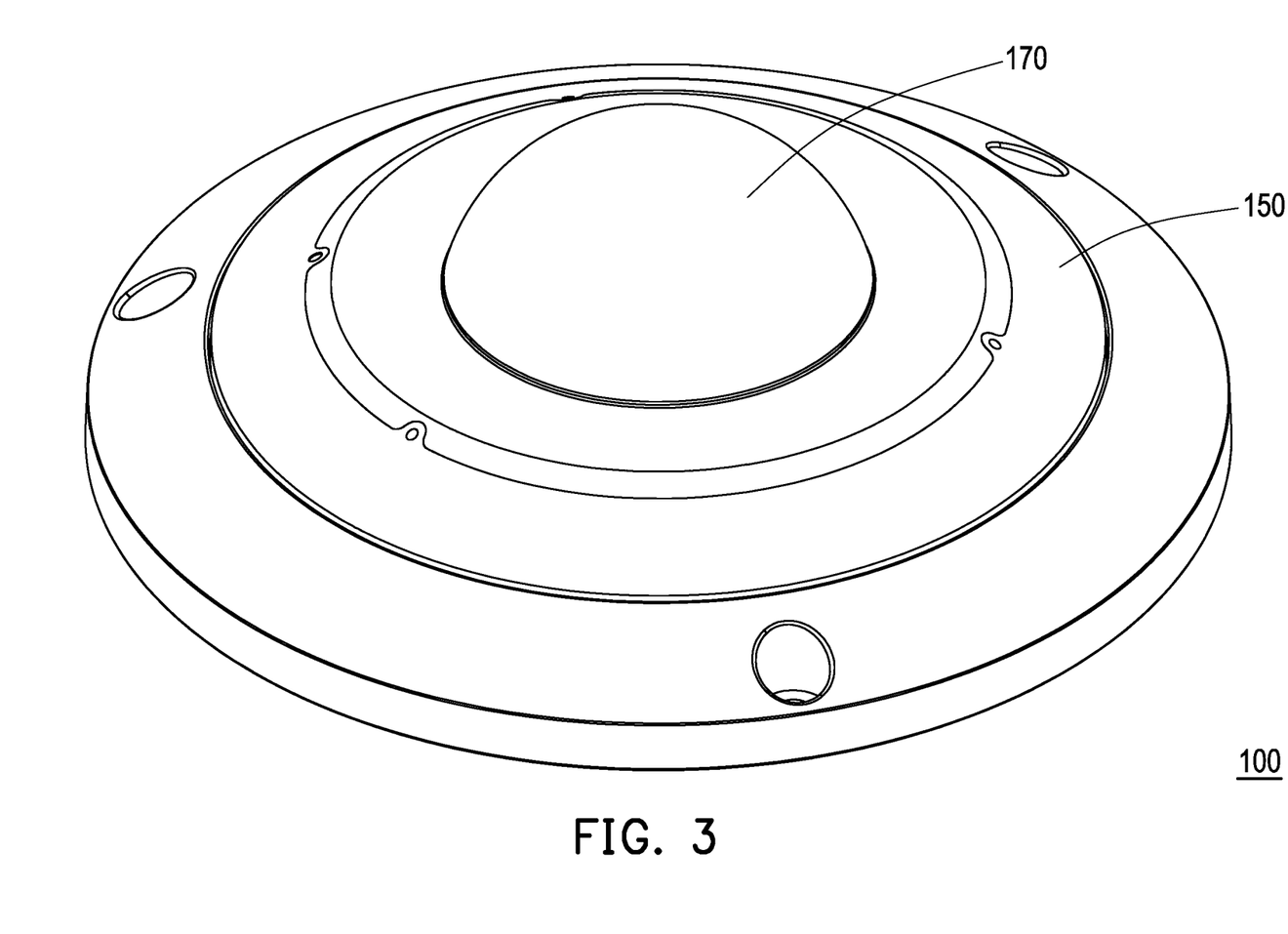
FIG. 3 is a schematic diagram of a tilted viewing angle of the optical sensing device of FIG. 1.

FIG. 1 is a schematic top view of an optical sensing device according to an embodiment of the invention, FIG. 2 is a schematic cross-sectional view of the optical sensing device of FIG. 1 viewing along a line I-I, and FIG. 3 is a schematic diagram of a tilted viewing angle of the optical sensing device of FIG. 1. Referring to FIG. 1 to FIG. 3, an optical sensing device 100 of the embodiment includes a base 110, a light sensing element 120, an image capturing lens 130, and at least one light source 140 (a plurality of light sources 140 are, for example, illustrated in FIG. 2) and a top cover 150. The light sensing element 120 is disposed on the base 110, and the image capturing lens 130 is disposed above the light sensing element 120. The light sources 140 are disposed on the base 110 and located beside the light sensing element 120. The base 110 may include a circuit board (such as a printed circuit board), which is electrically connected to the light sources 140. Each of the light sources 140 is configured to emit a light beam 142. The top cover 150 covers the light sources 140 and has at least one slit pattern 160 (a plurality of slit patterns 160 are taken as an example for description in FIG. 1 and FIG. 2), and each slit pattern 160 includes at least one slit. The slit pattern 160 is disposed on a path of the light beam 142 to diffract the light beam 142. In the embodiment, the top cover 150 is suitable for allowing the light beam 142 to pass through, i.e., the top cover 150 may be made of a material suitable for allowing the light beam 142 to pass through. The image capturing lens 130 is configured to collect a signal light 52 formed by an outside object 50 reflecting the diffracted light beam 142, and configured to transmit the signal light 52 to the light sensing element 120. Moreover, the light sensing element 120 is configured to sense the signal light 52. In the embodiment, the light sensing element 120 is an image sensor, such as a complementary metal oxide semiconductor image sensor (CMOS image sensor) or a charge coupled device (CCD). In the embodiment, the optical sensing device 100 further includes a protective cover 170 covering the image capturing lens 130 and the light sensing element 120. In the embodiment, the signal light 52 from the object 50 may pass through the protective cover 170 and is transmitted to the image capturing lens 130, and is then imaged on the light sensing element 120 by the image capturing lens 130.

However, in other embodiments, the optical sensing device 100 may also not have the protective cover 170, and the image capturing lens 130 is exposed to the environment. In the embodiment, the light beam 142 is, for example, an infrared light beam, and a wavelength thereof may fall within a range of 850 nanometers (nm) to 940 nm, but the invention is not limited thereto. In other embodiments, the light beam 142 may also be a visible light beam or an ultraviolet light beam.

In FIG. 2, in the process that the light beam 142 is transmitted to the object 50 from the slit pattern 160, a pair of S-shaped ellipsis symbols are shown in the figure, which represents that the object 50 may be located farther away from the slit pattern 160, but due to the limited space of the drawing, it is drawn closer and represented by the ellipsis symbols. Similarly, during the process that the signal light 52 is transmitted from the object 50 to the image capturing lens 130, there is also a pair of S-shaped ellipsis symbols, which also represents that the object 50 may be located farther away from the image capturing lens 130.

Figure 4:
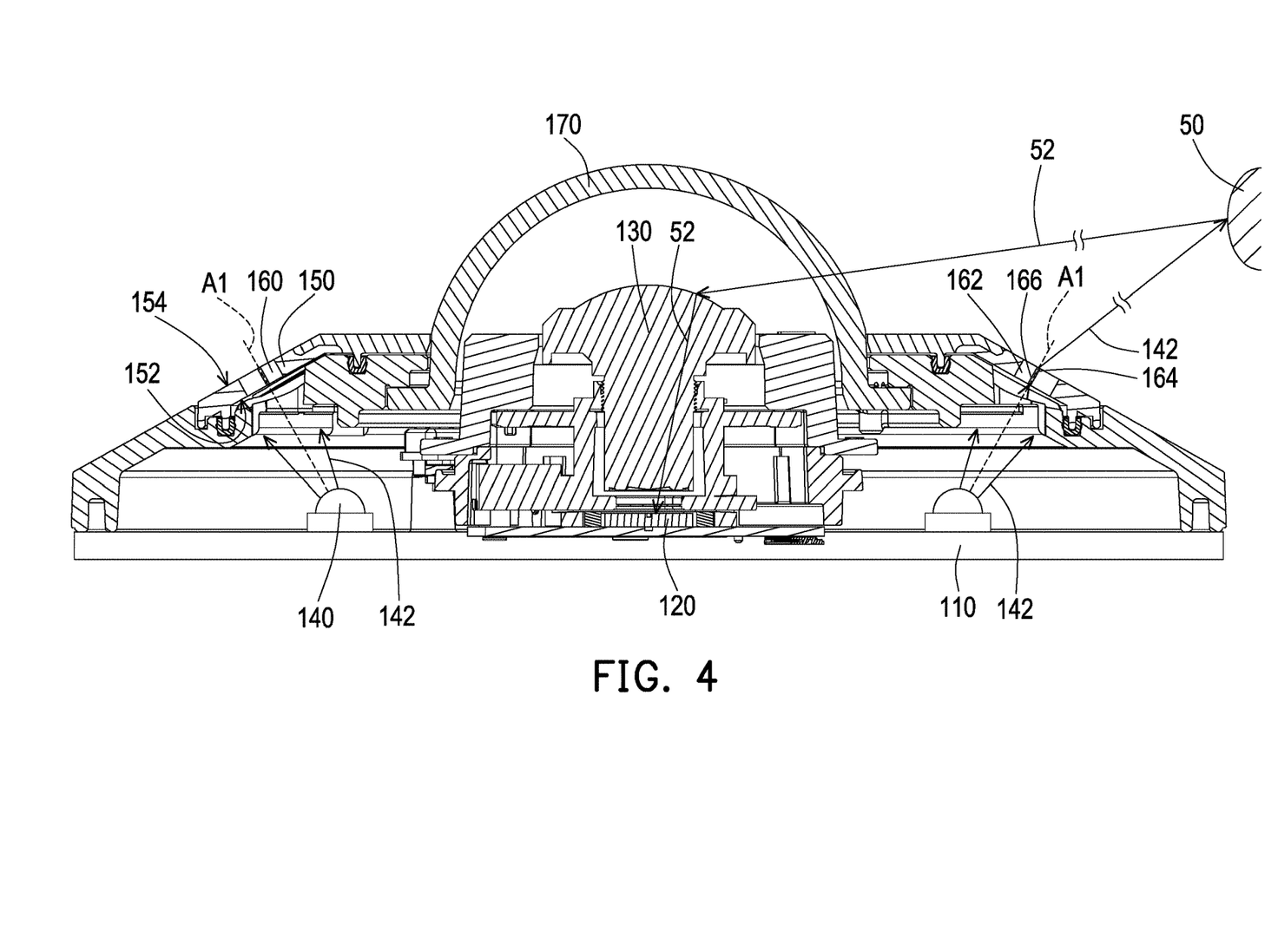
FIG. 4 is a schematic cross-sectional view of an optical sensing device according to another embodiment of the invention.

In the embodiment, the slit pattern 160 includes a first slit 162 and a second slit 164, and the first slit 162 and the second slit 164 intersect at an intersection point 166. In the embodiment, the first slit 162 and the second slit 164 are located on an inner surface 152 of the top cover 150 facing the light source 140, and do not penetrate through the top cover 150. In order to view a position of the slit pattern 160 from FIG. 1, in FIG. 1, a part of the top cover 150 is drawn in a transparent manner, so that the slit pattern 160 on the inner surface 152 of the top cover 150 may be seen through the top cover 150. However, in another embodiment, as shown in FIG. 4, the first slit 162 and the second slit 164 may also penetrate through the top cover 150, and at this time, the top cover 150 may be opaque to the light beam 142. Alternatively, in other embodiments, the first slit 162 and the second slit 164 may also be located on an outer surface 154 of the top cover 150 facing away from the light source 140 without penetrating through the top cover 150.

Figure 5:
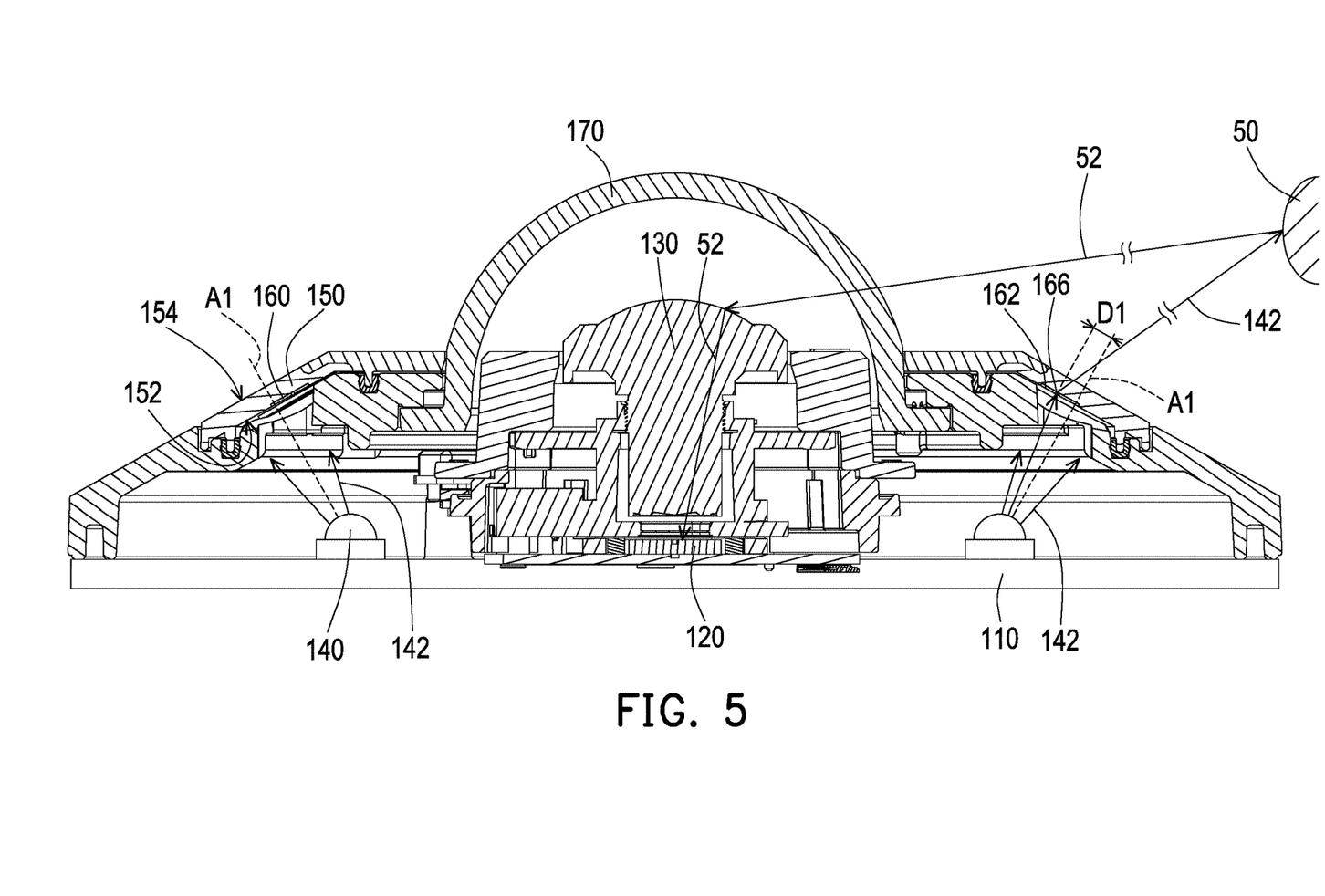
FIG. 5 is a schematic cross-sectional view of an optical sensing device according to another embodiment of the invention.
Figure 6:
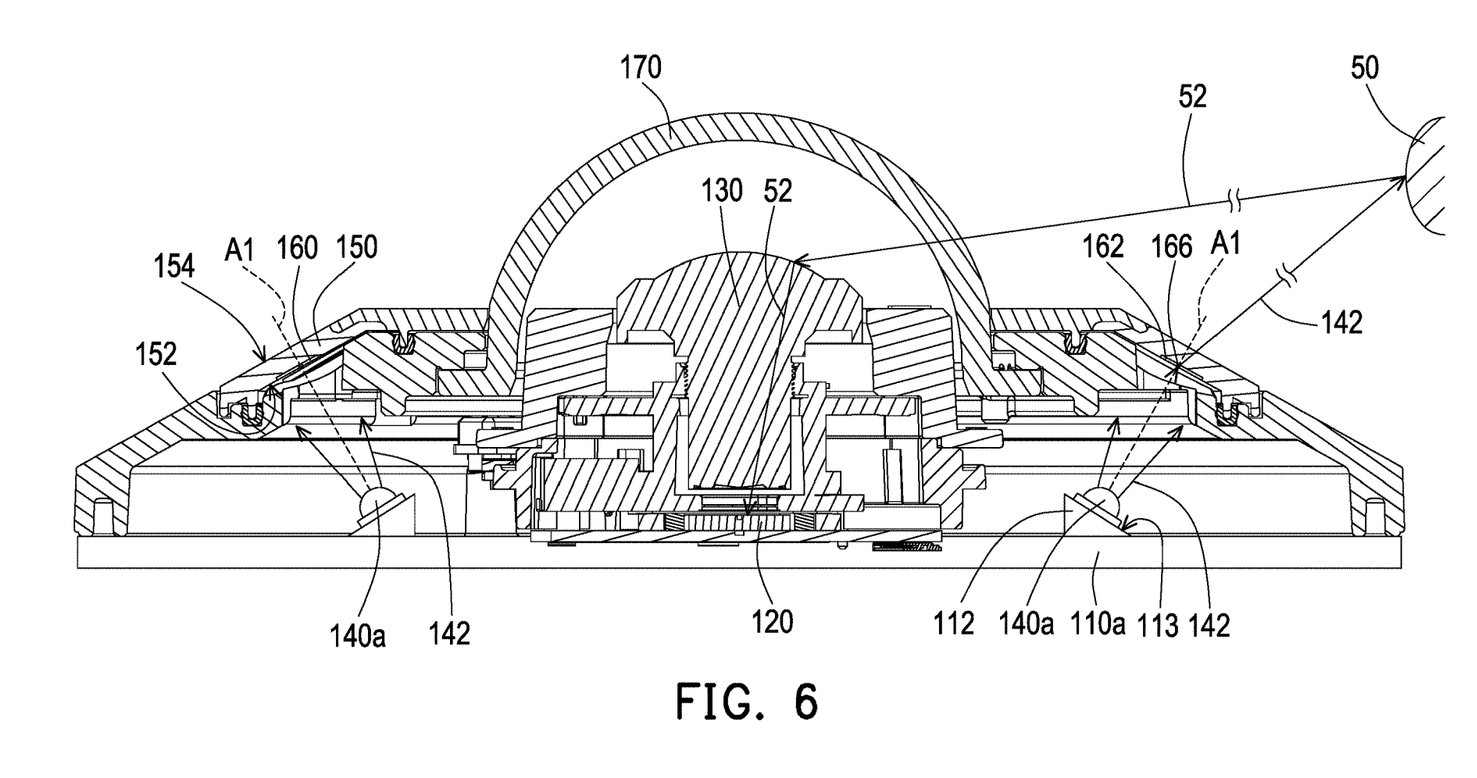
FIG. 6 is a schematic cross-sectional view of an optical sensing device according to another embodiment of the invention.

Referring to FIG. 1 to FIG. 3, in the embodiment, the light beam 142 has a central axis Al, and the central axis Al passes through the intersection point 166 of the slit pattern 160. In the embodiment, the central axis Al passes through the slit pattern 160 vertically. In addition, in the embodiment, the first slit 162 and the second slit 164 are perpendicular to each other. However, in another embodiment, as shown in FIG. 5, the central axis Al passes near the intersection point 166 of the slit pattern 160, and a shift distance D1 of the central axis Al relative to the intersection point 166 is within 0.2 millimeters (mm), and the central axis Al may be shifted in either direction. Referring to FIG. 1 and FIG. 3, in the embodiment, the slit pattern 160 is inclined relative to the base 110, and the light source 140 is a light-emitting diode that emits light obliquely. The effect of obliquely emitting light may be achieved by a design of a primary lens or a secondary lens of the light-emitting diode, which is well known to those skilled in the art and will not be repeated here. However, in another embodiment, as shown in FIG. 6, the light source 140a may also be a light-emitting diode that emits light in a forward direction, which is disposed on an inclined surface 113 of a protruding portion 112 of the base 110a.

Figure 7:
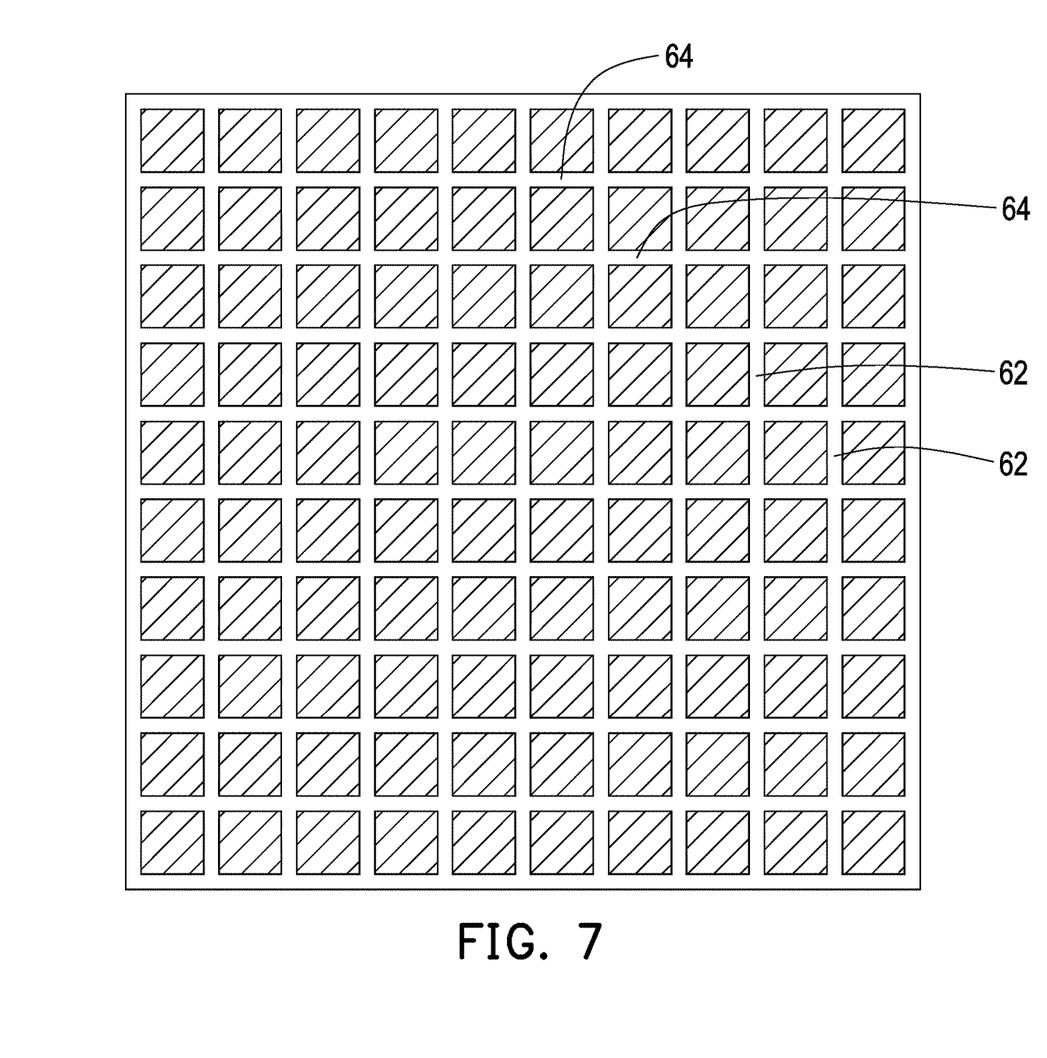
FIG. 7 is a schematic diagram of diffraction stripes formed when the light beam of FIG. 2 is irradiated on a wall.

FIG. 7 is a schematic diagram of diffraction stripes formed when the light beam of FIG. 2 is irradiated on a wall. Referring to FIG. 1, FIG. 2 and FIG. 7, when a wall is provided at a position of the object 50 of FIG. 2, after the light beam 142 is diffracted by the slit pattern 160, a plurality of first diffraction stripes 62 and a plurality of second diffraction stripes 64 as shown in FIG. 7 are formed on the wall.

In the embodiment, the second slit 164 is parallel to the base 110, and the base 110 may be placed on a horizontal plane, so that the second slit 162 may diffract the light beam 142 to form the plurality of second diffraction stripes 64 of a horizontal direction, and these second diffraction stripes 64 are arranged in a vertical direction. Moreover, since the first slit 162 is perpendicular to the second slit 164, the first slit 162 may diffract the light beam 142 to form the plurality of first diffraction stripes 62 of the vertical direction, and the plurality of first diffraction stripes 62 of the vertical direction are arranged in the horizontal direction. In the embodiment, the first diffraction stripes 62 may be perpendicular to the second diffraction stripes 64.

In the embodiment, the light sources 140 and the slit patterns 160 surround the image capturing lens 130. These light sources 140 and these slit patterns 160 may be in a one-to-one relationship, so that the six slit patterns 160 shown in FIG. 1 may correspond to the six light sources 140. However, the invention does not limit the number of the slit patterns 160 and the light sources 140, which may be other numbers in other embodiments. In the embodiment, the image capturing lens 130 is a fisheye lens. In addition, in the embodiment, after the light beams 142 emitted by the light sources 140 respectively pass through the slit patterns 160, a plurality of diffraction stripes are formed respectively (such as the first diffraction stripes 62 and the second diffraction stripes 64 of FIG. 7), and these diffraction stripes surround a field of view of the image capturing lens 130. In an embodiment, the at least one light beam 142 emitted by the at least one light source 140 passes through the slit pattern 160 to form a plurality of diffraction stripes, and these diffraction stripes are formed in the field of view of the image capturing lens 130.

However, in other embodiments, the image capturing lens 130 may also be a wide-angle lens or a non-wide-angle lens with a smaller field of view than that of the fisheye lens, the number of the light sources 140 and the number of the slit patterns 160 may be respectively one, and a direction along which the light beam 142 of the light source 140 is transmitted to the slit pattern 160 may be substantially parallel to an optical axis of the image capturing lens 130, but the invention is not limited thereto. Alternatively, in other embodiments, the slit pattern 160 may also have only one of the first slit 162 and the second slit 164, and diffract the light beam 142 to form one of the first diffraction stripes 62 and the second diffraction stripes 64.

In the optical sensing device of the embodiment, the slit pattern 160 may diffract the light beam 142 emitted by the light source 140, so as to generate the diffraction stripes (such as the first diffraction stripes 62 and/or the second diffraction stripes 64) on the outside object 50, and these diffraction stripes may be used as virtual borders for an algorithm to calculate movement parameters of the object. To be specific, since an image of the object 50 captured by the light sensing element 120 has an obvious pattern of diffraction stripes (which may be regarded as virtual borders), when the object 50 moves, it will obviously move relative to the diffraction stripes, so that an algorithm executed by a processor or a controller electrically connected to the light sensing element 120 may calculate the movement parameters of the object 50 based on the movement of the object 50 relative to the diffraction stripes. The first diffraction stripes 62 help the algorithm to calculate parameters of horizontal movement of the object 50, and the second diffraction stripes 64 help the algorithm to calculate parameters of vertical movement of the object 50. When the slit pattern 160 only has one of the first slit 162 and the second slit 164 to form one of the first diffraction stripes 62 and the second diffraction stripes 64, one of the first diffraction stripes 62 and the second diffraction stripes 64 are formed in the field of view of the image capturing lens 130, which may help the algorithm to calculate the movement parameters of the object 50 in the corresponding direction.

In the embodiment, as shown in FIG. 1, six slit patterns 160 and six light sources 140 may generate six groups of virtual borders, and these six groups of virtual borders are formed in the field of view of the image capturing lens 130, and in collaboration with the image capturing lens 130 and the light sensing element 120, a 360-degree photographic effect of a panoramic view without blind spot is achieved.

In the embodiment, a width W1 of the first slit 162 is greater than or equal to 0.01 mm and less than or equal to 0.02 mm, and a width W2 of the second slit 164 is greater than or equal to 0.01 mm and less than or equal to 0.02 mm.

A diffraction equation of the first slit 162 and the second slit 164 to the light beam 142 is a following single slit diffraction equation:

$$y = m\lambda d/a \qquad \text{equation (1)}$$

Where, m is a diffraction order, i.e., an $m^{th}$ diffraction stripe is counted from a central diffraction stripe (i.e., a $0^{th}$ diffraction stripe); y is a distance between the $m^{th}$ diffraction stripe and the central diffraction stripe; $\lambda$ is a wavelength of the light beam 142, a is a width of the slit, i.e., the width W1 or width W2 in FIG. 1; d is a distance between the light source 140 and the wall on which the diffraction stripes are projected.

The following Table 1 and Table 2 are two groups of experimental data of the optical sensing device 100 of the embodiment:

TABLE 1

| m: $m^{th}$ diffraction stripe | 1 | 2 | 3 | 4 | 5 | 6 |
|---|---|---|---|---|---|---|
| $\lambda$: wavelength (nm) | 850 | 850 | 850 | 850 | 850 | 850 |
| a: slit width (mm) | 0.02 | 0.02 | 0.02 | 0.02 | 0.02 | 0.02 |
| d: distance between light source and wall (mm) | 20000 | 20000 | 20000 | 20000 | 20000 | 20000 |
| y: distance between the diffraction stripe and central diffraction stripe (mm) | 850 | 1700 | 2550 | 3400 | 4250 | 5100 |

TABLE 2

| m: $m^{th}$ diffraction stripe | 1 | 2 | 3 | 4 | 5 | 6 |
|---|---|---|---|---|---|---|
| $\lambda$: wavelength (nm) | 850 | 850 | 850 | 850 | 850 | 850 |
| a: slit width (mm) | 0.01 | 0.01 | 0.01 | 0.01 | 0.01 | 0.01 |
| d: distance between light source and wall (mm) | 10000 | 10000 | 10000 | 10000 | 10000 | 10000 |
| y: distance between the diffraction stripe and central diffraction stripe (mm) | 850 | 1700 | 2550 | 3400 | 4250 | 5100 |

In summary, in the optical sensing device of the embodiment of the invention, the slit pattern is adapted to diffract the light beam emitted by the light source to generate diffraction stripes on an outside object, and these diffraction stripes are adapted to be used as virtual borders for the algorithm to calculate the movement parameters of the object. Therefore, the optical sensing device of the embodiment is adapted to generate virtual borders to facilitate processing of the algorithm.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical sensing device, comprising:
   a base;
   a light sensing element, disposed on the base;
   an image capturing lens, disposed above the light sensing element;
   at least one light source, disposed on the base, located beside the light sensing element, and configured to emit at least one light beam; and
   a top cover, covering the at least one light source and having at least one slit pattern that comprises at least one slit, wherein the at least one slit pattern is disposed on a path of the at least one light beam to diffract the at least one light beam, and the image capturing lens is configured to collect a signal light formed by an outside object reflecting a diffracted light beam and transmit the signal light to the light sensing element;

wherein the slit pattern comprises a first slit and a second slit, and the first slit and the second slit intersect at an intersection point.

2. The optical sensing device according to claim 1, wherein the at least one light beam has a central axis, and the central axis passes through the intersection point.

3. The optical sensing device according to claim 2, wherein the central axis passes through the slit pattern vertically.

4. The optical sensing device according to claim 1, wherein the first slit and the second slit are perpendicular to each other.

5. The optical sensing device according to claim 1, wherein the at least one light beam has a central axis, the central axis passes near the intersection point, and a shift distance of the central axis relative to the intersection point is within 0.2 millimeters.

6. The optical sensing device according to claim 1, wherein the at least one light source is a plurality of light sources, the at least one slit pattern is a plurality of slit patterns, and the light sources and the slit patterns surround the image capturing lens.

7. The optical sensing device according to claim 6, wherein after the light beams emitted by the light sources respectively pass through the slit patterns, a plurality of diffraction stripes are respectively formed, and the diffraction stripes surround a field of view of the image capturing lens.

8. The optical sensing device according to claim 7, wherein the diffraction stripes are used as virtual borders for an algorithm to calculate movement parameters of the object.

9. The optical sensing device according to claim 1, wherein the first slit and the second slit are located on an inner surface of the top cover facing the light source, and do not penetrate through the top cover.

10. The optical sensing device according to claim 1, wherein the first slit and the second slit penetrate through the top cover, and the top cover is opaque to the at least one light beam.

11. The optical sensing device according to claim 1, further comprising a protective cover covering the image capturing lens and the light sensing element.

12. The optical sensing device according to claim 1, wherein the image capturing lens is a fisheye lens.

13. The optical sensing device according to claim 1, wherein a width of the first slit and a width of the second slit are greater than or equal to 0.01 mm and less than or equal to 0.02 mm.

14. The optical sensing device according to claim 1, wherein the at least one light beam is an infrared light beam.

15. The optical sensing device according to claim 1, wherein the light sensing element is an image sensor.

16. The optical sensing device according to claim 1, wherein the light source is a light-emitting diode that emits light obliquely.

17. The optical sensing device according to claim 1, wherein the light source is a light-emitting diode that emits light in a forward direction and is disposed on an inclined surface of a protruding portion of the base.

18. The optical sensing device according to claim 1, wherein after the at least one light beam emitted by the at least one light source passes through the slit pattern, a plurality of diffraction stripes are formed, and the diffraction stripes are formed in a field of view of the image capturing lens.

* * * * *